(12) United States Patent
Benjey et al.

(10) Patent No.: US 7,055,556 B2
(45) Date of Patent: Jun. 6, 2006

(54) CONTROLLING VAPOR RECIRCULATION DURING REFUELING OF A TANK THROUGH A FILLER TUBE FROM A DISPENSING NOZZLE

(75) Inventors: Robert P. Benjey, Dexter, MI (US); Craig H. Allman, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 281 days.

(21) Appl. No.: 10/612,748

(22) Filed: Jul. 2, 2003

(65) Prior Publication Data

US 2005/0000590 A1 Jan. 6, 2005

(51) Int. Cl.
*B65B 31/00* (2006.01)

(52) U.S. Cl. .................. 141/6; 141/4; 141/45; 141/59; 141/198

(58) Field of Classification Search ............... 141/4–8, 141/44–46, 59–61, 198; 123/516–519; 137/587, 137/588; 220/86.2
See application file for complete search history.

(56) References Cited

U.S. PATENT DOCUMENTS

| 4,714,172 | A |   | 12/1987 | Morris ..................... 220/86 R |
| 5,054,528 | A | * | 10/1991 | Saitoh ......................... 141/59 |
| 5,215,132 | A | * | 6/1993 | Kobayashi ................. 141/302 |
| 5,282,497 | A |   | 2/1994 | Allison ........................ 141/59 |
| 5,570,672 | A | * | 11/1996 | Kunimitsu et al. ......... 123/516 |
| 5,606,954 | A |   | 3/1997 | Yamazaki et al. |
| 6,062,276 | A | * | 5/2000 | Benjey et al. .............. 141/198 |
| 6,170,538 | B1 |   | 1/2001 | Devall |
| 6,851,458 | B1 | * | 2/2005 | Nakamura et al. ............ 141/44 |

* cited by examiner

*Primary Examiner*—Timothy L. Maust
(74) *Attorney, Agent, or Firm*—Anna M. Shih

(57) ABSTRACT

A two-stage pressure differential pressure responsive flow control valve is disposed to provide greater fuel vapor recirculation to a tank filler tube when high vacuum conditions are encountered during refueling from a fuel dispensing nozzle inserted in the filler tube. The pressure responsive valve has an obturator with a passage therethrough for providing a relatively low flow rate when the valve is in the closed condition resulting from a relatively low vacuum during refueling. When a higher vacuum is encountered, the obturator is moved to the open position permitting greater flow. Preferably, the pressure responsive valve is disposed in a common housing with a float operated rollover valve.

14 Claims, 2 Drawing Sheets

CONTROLLING VAPOR RECIRCULATION DURING REFUELING OF A TANK THROUGH A FILLER TUBE FROM A DISPENSING NOZZLE

BACKGROUND OF THE INVENTION

The present invention relates to systems for controlling the recirculation of fuel vapor from the vapor dome in a tank to the filler tube for controlling operation of the automatic nozzle shutoff when the level of fuel in the tank reaches a predetermined maximum.

Fuel vapor recirculation systems have been employed in motor vehicle fuel tank installations for accommodating the reduced pressure in the region surrounding the liquid discharge from the dispensing nozzle during refueling and particularly where a mechanical seal is provided about the nozzle upon insertion in the filler tube for preventing fuel vapors escaping to the atmosphere during refueling.

In such systems problems have been encountered in designing the system to accommodate the wide variation in nozzle dispensing rates experienced in different regions. For example, in the majority of vehicle service regions the nozzles are set to shut off when a vacuum of about 1.75 to 2.5 kPa is reached in the filler tube. The normal vacuum during fuel discharge is about 0.5 kPa and requires about six liters per minute of recirculation vapor flow to maintain the vacuum at this level. However, in regions, a greater degree of sealing is required about the nozzle resulting in a need for about 70 liters per minute recirculation vapor flow to maintain 0.5 kPa vacuum and to prevent premature nozzle shut-off. Thus, it has been difficult to design a system for providing sufficient vapor recirculation to the filler tube during refueling in order to accommodate the wide range of vapor flow required to accommodate the variety of refueling requirements. If the system is designed to accommodate the maximum vapor flow to be required during refueling, the system will react to cause pressure build up in the filler tube in the region surrounding the nozzle and result in leakage of fuel vapor past the nozzle seal to the atmosphere. It will be understood that such systems include a second vapor line to a vapor storage device, such as a canister filled with granulated charcoal, for storing fuel vapor displaced by the rising liquid fuel level in the tank. The system must therefore maintain a proper balance of vapor flow to the canister and to the filler tube regions surrounding the nozzle in order to maintain the integrity of the system in preventing escape of fuel vapor to the atmosphere and also to facilitate proper filling from the refueling nozzle and prevent premature activation of the automatic shutoff device provided in the nozzle.

BRIEF SUMMARY OF THE INVENTION

The present invention provides a solution to the above-described problem and employs a vapor recirculation valve responsive to the pressure in a fuel tank filler tube region surrounding a dispensing nozzle seal during refueling for controlling the amount of vapor recirculated to the filler tube nozzle region. In the preferred embodiment, a differential pressure responsive valve opens to increase the amount of vapor recirculated to the filler tube nozzle region when a predetermined vacuum or negative pressure is encountered in the region surrounding the nozzle during refueling. The differential pressure responsive valve is preferably combined in a common housing with a float operated valve which serves to close the vapor recirculation line when the fuel level in the tank has reached a predetermined level, or in the event of vehicle rollover. The valve of the present invention is operable for providing a first or relatively low rate of flow when the valve is in the closed condition. Upon the valve experiencing a predetermined pressure differential between the pressure in the filler tube and the pressure in the tank vapor dome, the valve opens and provides a second significantly increased or relatively high rate of vapor flow for recirculation. Preferably, the differential pressure responsive valve employs a moveable obturator with a passage therethrough for providing the first rate of flow.

DETAILED DESCRIPTION OF THE INVENTION

Figure 1:
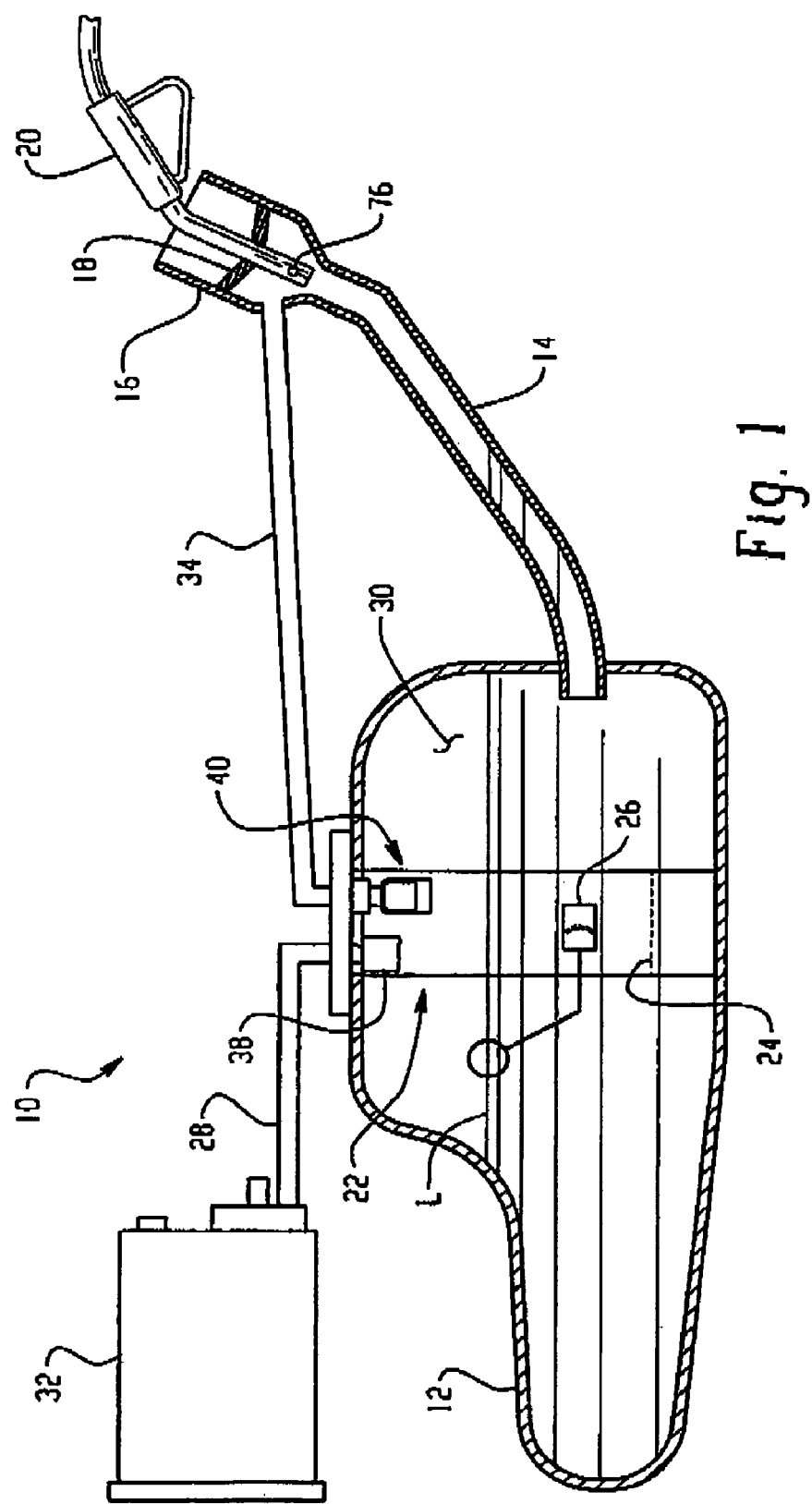
FIG. 1 is a schematic of a fuel tank vapor control system employing the valve assembly of the present invention for controlling vapor recirculation to the filler tube during refueling; and, FIG. 2 is a cross-sectional view of the control valve for recirculation of the embodiment of FIG. 1.

Referring to FIG. 1, the fuel tank vapor emission system is indicated generally at 10 and includes a fuel tank 12 filled with liquid fuel to a level L and having a filler tube 14 connected through a wall of the tank. A nozzle receiving cup 16 is provided and preferably formed at the upper end of the filler tube with a flexible seal 18 disposed therein for sealing about a dispensing nozzle 20 upon insertion therein.

The tank 20 includes a fuel pump/level sender module indicated generally at 22 which has a pump 24 and a level sender 26 immersed in the fuel. A vapor storage line 28 communicates through the module with the vapor dome 30 within the tank and above the liquid fuel, which line is connected to a storage device 32 which may comprise a canister filled with adsorbent material such as granulated charcoal. The module 22 has a vapor recirculation line 34 connected thereto which is also connected to the cup 16 and the upper end of the filler tube at a location downstream of the nozzle seal 18.

A vapor storage line 28 is connected to a float operated valve 38 which serves to close the line 28 upon the level L of the fuel rising to the full mark in the tank. It will be understood that valve 38 also closes in the event of a vehicle rollover.

A second valve assembly indicated generally at 40 is connected to recirculation line 34 and functions as will hereinafter be described.

Figure 2:
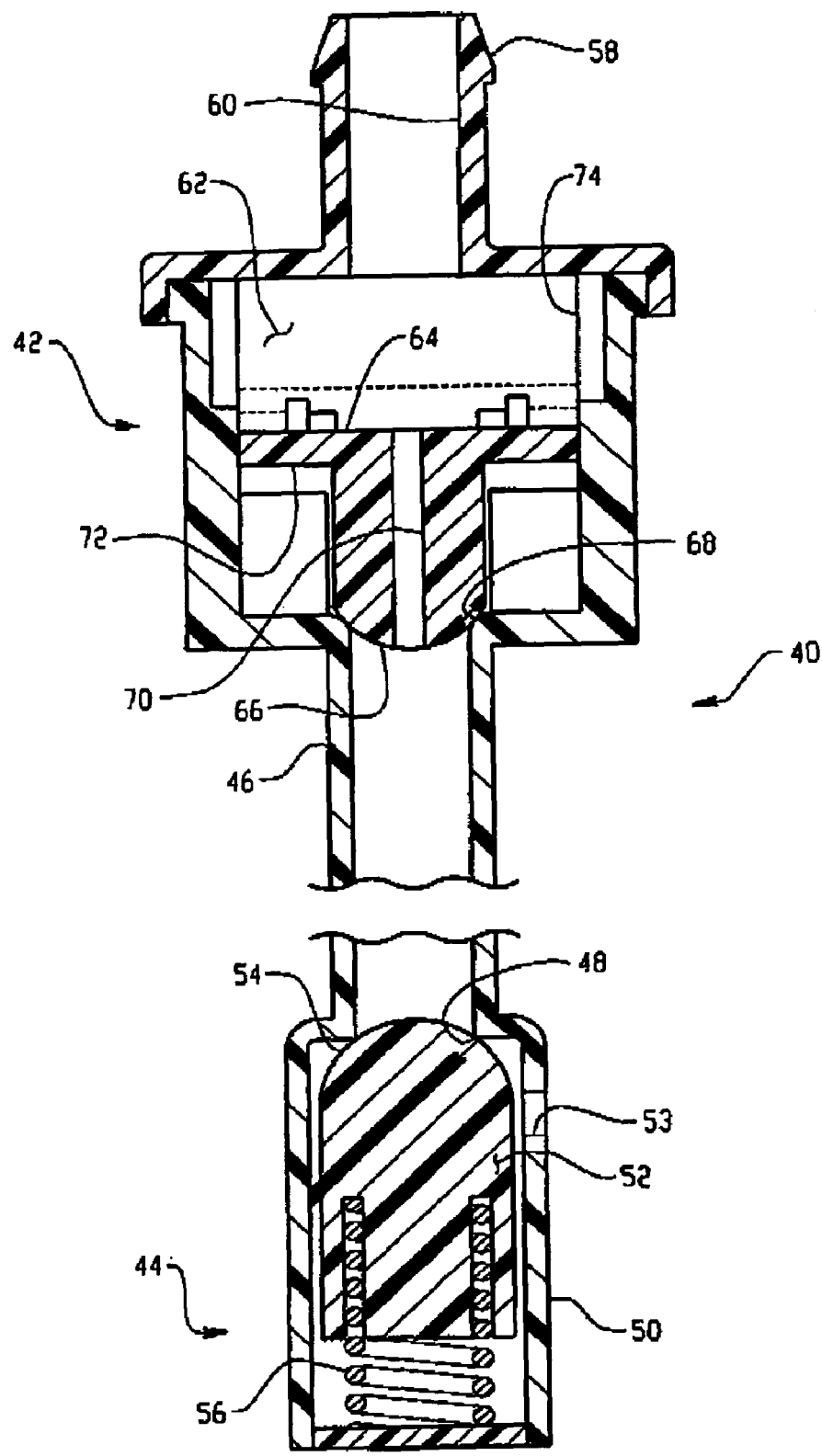

Referring to FIG. 2, the valve assembly 40 includes a two-stage vacuum or differential pressure operated valve indicated generally at 42 and a float operated valve indicated generally at 44 preferably mounted in a common housing 46 with valve 42.

Float operated valve 44 includes a valve seat 48 formed in the housing within an enlarged diameter portion 50 and includes a float 52 having a valving surface 54 provided on the upper end thereof for closing against the valve seat 48 in response to the level L of the fuel in the tank reaching the float 52 through aperture 53 provided in housing 50. It will be understood valve 44 also closes in the event of a vehicle rollover. The float is calibrated by a buoyancy spring 56 provided within the portion 50 of the housing in a manner known in the art.

The two-stage flow control valve 42 has a fitting 58 which is adapted to be connected to the recirculation line 34 (not shown in FIG. 2) with an outlet passage 60 formed therein communicating with an enlarged diameter chamber 62. A moveable obturator 64 is slidably disposed therein and which has a valving surface 66 formed on the lower end thereof for movement with respect to valve seat 68 formed in the chamber 62. A reduced diameter or limited flow passage 70 is formed through the obturator 64 and provides for limited or a relatively low rate of flow to the outlet passage 60 when the obturator is closed against valve seat 68.

The upper end of the obturator 64 has a piston portion 72 which closely interfits with bore 74 formed in the chamber 62 for sliding movement therein. It will be understood that the piston 72 and the valving surface 66 are removed in response to differential pressure forces acting across the piston 72 such as those created by a vacuum being formed in the cup 16.

In operation, with a typical nozzle 20 having a vacuum shutoff mechanism therein (not shown), activated by vacuum within the region of cup 16 below the seal 18 acting through a port 76 provided in the nozzle. In the more common and widely used systems, during refueling the pressure in the cup in the space below seal 18 runs at about 0.5 kPa sub-atmospheric depression or vacuum; and, the more common nozzles are set to shut off when the vacuum is in the range of about 1.75 to 2.5 kPa. These settings represent a fuel vapor flow through conduit 34 of about six liters per minute.

However, in those geographic regions where tighter seal requirements are required for the nozzle, or where the nozzle includes a bellows or seal sealing over the upper end of cup 16, the fuel flow discharging from the nozzle creates a greater depression or vacuum within the cup 16. In such systems a vacuum level of about one kPa differential pressure is created between the space within the cup 16 and the vapor pressure within the tank dome 30; and this causes obturator 64 to move upwardly opening valve seat 68 to permit greater flow.

It will be understood that at vacuum levels below one kPa, obturator 64 is seated against valve seat 68 and flow is through the passage 70.

It will further be understood that the settings for the opening of valve 42 may be changed to accommodate different regional nozzle configurations as may be required.

The present invention thus provides for controlling the recirculation of fuel vapor to a filler tube to prevent creation of a relatively strong vacuum in the filler tube and from causing premature shutoff of the vacuum actuated mechanism in the dispensing nozzle. The vacuum operated flow control valve for vapor recirculation of the present invention may conveniently be combined in a common housing with a float operated rollover shutoff valve.

Although the invention has hereinabove been described with respect to the illustrated embodiments, it will be understood that the invention is capable of modification and variation and is limited only by the following claims.

What is claimed is:

1. A system for controlling fuel vapor recirculation during refueling of a tank from a dispensing nozzle, the system comprising:
   (a) a filler tube with a means for sealing about the nozzle;
   (b) a means defining a vapor recirculation path from the tank to the filler tube at a location downstream of said means for sealing about the nozzle;
   (c) a vapor storage device disposed externally of the tank and connected to receive fuel vapor 1mm the tank; and,
   (d) a flow control valve disposed In said recirculation path, said flow control valve responsive to a predetermined pressure differential across the valve to change from a first flow rate to a second flow rate higher than the first flow rate.

2. The system defined in claim 1, wherein said flow control valve includes a valve obturator moveable between an open and closed position with a passage therethrough providing said first flow rate when said obturator is in said closed position, said obturator providing said second flow rate in said open position.

3. The system defined in claim 1, wherein said flow control valve includes a piston having a passage therethrough.

4. The system defined in claim 1, further comprising a float operated valve is disposed fluidically in series with said flow control valve in said recirculation path.

5. The system defined in claim 4, wherein said flow control valve and said float operated valve are mounted in a common housing through an access opening in the tank.

6. The system defined in claim 5, wherein said flow control valve and said float operated valve are mounted in vertically aligned arrangement.

7. The system defined in claim 1, wherein said flow control valve is operative to change to said second flow rate at a pressure differential thereacross of about 1 kPa (4 in, $H_2O$).

8. A method of controlling fuel vapor recirculation during refueling of a tank from a dispensing nozzle comprising:
   (a) providing a tank filler tube with a nozzle receiving cup end disposing an annular seal in the cup and sealing about the nozzle upon insertion therein;
   (b) providing a vapor recirculation passage from the tank to the filler tube cup downstream of the nozzle seal;
   (c) disposing a pressure responsive flow control valve in said recirculation passage and changing the rate of flow in said passage from a first rate to a second rate higher than the first rate when said valve experiences a predetermined pressure differential thereacross.

9. The method defined in claim 8, wherein said step of disposing the pressure responsive flow control valve includes disposing a valve with an obturator having a passage therethrough; and wherein said step of changing the rate of flow includes moving the obturator between an open and closed position.

10. The method defined in claim 8, further comprising disposing a second valve in said recirculation line, wherein said second valve is responsive to a fluid level.

11. The method defined in claim 10, wherein said step of disposing a second valve includes disposing a float operated valve, and wherein the method further includes disposing said flow control valve and said float operated valve in a common housing.

12. The method defined in claim 11, wherein said step of disposing in a common housing includes mounting said housing through an access opening in the tank.

13. The method defined in claim 8, wherein said step of disposing a flow control valve includes disposing a valve with a moveable piston and forming a passage through the piston for providing the first flow rate.

14. The method defined in claim 8, further comprising disposing a float operated valve vertically aligned with said flow control valve.

* * * * *